United States Patent
Sergott et al.

(10) Patent No.: US 11,742,664 B2
(45) Date of Patent: Aug. 29, 2023

(54) METHODS AND SYSTEMS FOR CHARGING OR DISCHARGING ENERGY STORAGE SYSTEMS

(71) Applicant: Caterpillar Inc., Peoria, IL (US)

(72) Inventors: Kevin J. Sergott, Dunlap, IL (US); Ronald C. Gayles, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 329 days.

(21) Appl. No.: 17/080,962

(22) Filed: Oct. 27, 2020

(65) Prior Publication Data

US 2022/0131381 A1    Apr. 28, 2022

(51) Int. Cl.
*H02J 7/00* (2006.01)
*H02J 3/32* (2006.01)

(52) U.S. Cl.
CPC .............. *H02J 3/32* (2013.01); *H02J 7/0013* (2013.01); *H02J 7/0048* (2020.01); *H02J 2300/30* (2020.01)

(58) Field of Classification Search
USPC ....... 320/106, 107, 108, 110, 112, 124, 126, 320/128
See application file for complete search history.

(56) References Cited

U.S. PATENT DOCUMENTS

| | | |
|---|---|---|
| 8,946,929 B2 | 2/2015 | Singh et al. |
| 9,979,195 B2 * | 5/2018 | Djan-Sampson ......... H02J 3/28 |
| 2017/0033573 A1 | 2/2017 | Yoo |
| 2020/0301383 A1 | 9/2020 | Reddy |
| 2021/0021134 A1 * | 1/2021 | Alipoor ................. H02J 7/0013 |

FOREIGN PATENT DOCUMENTS

| | | | |
|---|---|---|---|
| CN | 104538982 B | 8/2016 | |
| CN | 110556852 A | 12/2019 | |
| CN | 110797895 A | 2/2020 | |
| CN | 110854927 A | 2/2020 | |
| WO | WO-2015136920 A1 * | 9/2015 | ......... H02J 13/0017 |
| WO | WO-2019150814 A1 * | 8/2019 | .......... F16H 53/025 |

OTHER PUBLICATIONS

European Search Report for Int'l. Patent Appln. No 21200022.8-1202, dated Mar. 28, 2022 (8 pgs).

* cited by examiner

*Primary Examiner* — Brian Ngo
(74) *Attorney, Agent, or Firm* — Bookoff McAndrews PLLC (57) ABSTRACT

A method of allocating power across a microgrid having a plurality of energy storage systems with different power and/or energy capacities, and different states of charge. The method includes allocating a total charge request and/or a total discharge request across the energy storage systems as a function of a usable energy capacity of each energy storage system.

22 Claims, 6 Drawing Sheets

METHODS AND SYSTEMS FOR CHARGING OR DISCHARGING ENERGY STORAGE SYSTEMS

TECHNICAL FIELD

The present disclosure relates generally to energy storage systems, and more particularly, to methods and systems for charging and/or discharging energy storage systems.

BACKGROUND

The present disclosure relates to the control of microgrids that send and receive power. Microgrids may include a plurality of different energy storage systems, such as different battery systems, fuel cells, etc. The different energy storage systems may have different power and energy capacities, and may be at different states of charge. With such varied characteristics between the energy storage systems, charging and discharging the systems in a balanced manner can be difficult. Unbalanced distribution of charge or discharge can affect the health or life of one or more of the energy storage systems, and thus negatively affect the microgrid.

Chinese Patent Application Publication CN110854927A ("the '927 publication"), describes a cooperative control method for an island-type microgrid. The method includes establishing a distributed cooperative communication network to control generators and battery energy storage systems (BESS) of the microgrid to achieve a power balance. The method further includes (1) adopting a consensus algorithm to make the distributed power supply meet the criteria of equal micro-increase rate, that is, the cost of power generation is minimal; (2) using a consistency algorithm, treating the state of charge of each battery energy storage system as a consistency variable, and calculating the average value of the state of charge of the BESSs; and (3) using a p-f droop control method based on the state of charge to adjust the output power of the BESSs so that the state of charge of the BESSs remains balanced. As shown in FIG. 2 of the '927 publication, each BESS first communicates its own state of charge to a neighboring BESS, and each BESS adjusts its state of charge according to its state of charge and the state of charge received from the neighbor. Eventually, the state of charge of each BESS tends to be consistent, corresponding to an average value of the required state of charge. Thus, the method of the '927 publication attempts to balance the state of charge of the BESSs by sharing state of charge information between neighboring BESSs.

The systems and method of the present disclosure may solve one or more of the problems set forth above and/or other problems in the art. The scope of the current disclosure, however, is defined by the attached claims, and not by the ability to solve any specific problem.

SUMMARY

The present disclosure provides for a method of allocating power across a microgrid having a plurality of energy storage systems with different power and/or energy capacities, and different states of charge. The method includes allocating a total charge request and/or a total discharge request across the energy storage systems as a function of a usable energy capacity of each energy storage system.

In another aspect, the present disclosure provides for a method of allocating power across a microgrid having a plurality of energy storage systems with different power and/or energy capacities, and different states of charge. The method includes allocating a total charge request and/or a total discharge request across the energy storage systems as a function of a current energy, and current state of charge of each energy storage system.

In yet another aspect, the present disclosure provides for a microgrid system including a plurality of energy storage systems having different power and/or energy capacities, and different states of charge; and a microgrid controller communicatively coupled to each energy storage system for sending information to, and receiving information from, each energy storage system. The microgrid controller is configured to allocate a total charge request and/or a total discharge request across the energy storage systems as a function of a usable energy capacity of each energy storage system.

DETAILED DESCRIPTION

Both the foregoing general description and the following detailed description are exemplary and explanatory only and are not restrictive of the features, as claimed. The same reference numbers in different alternatives are used to describe the same components or functions. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value or characteristic.

Figure 1:
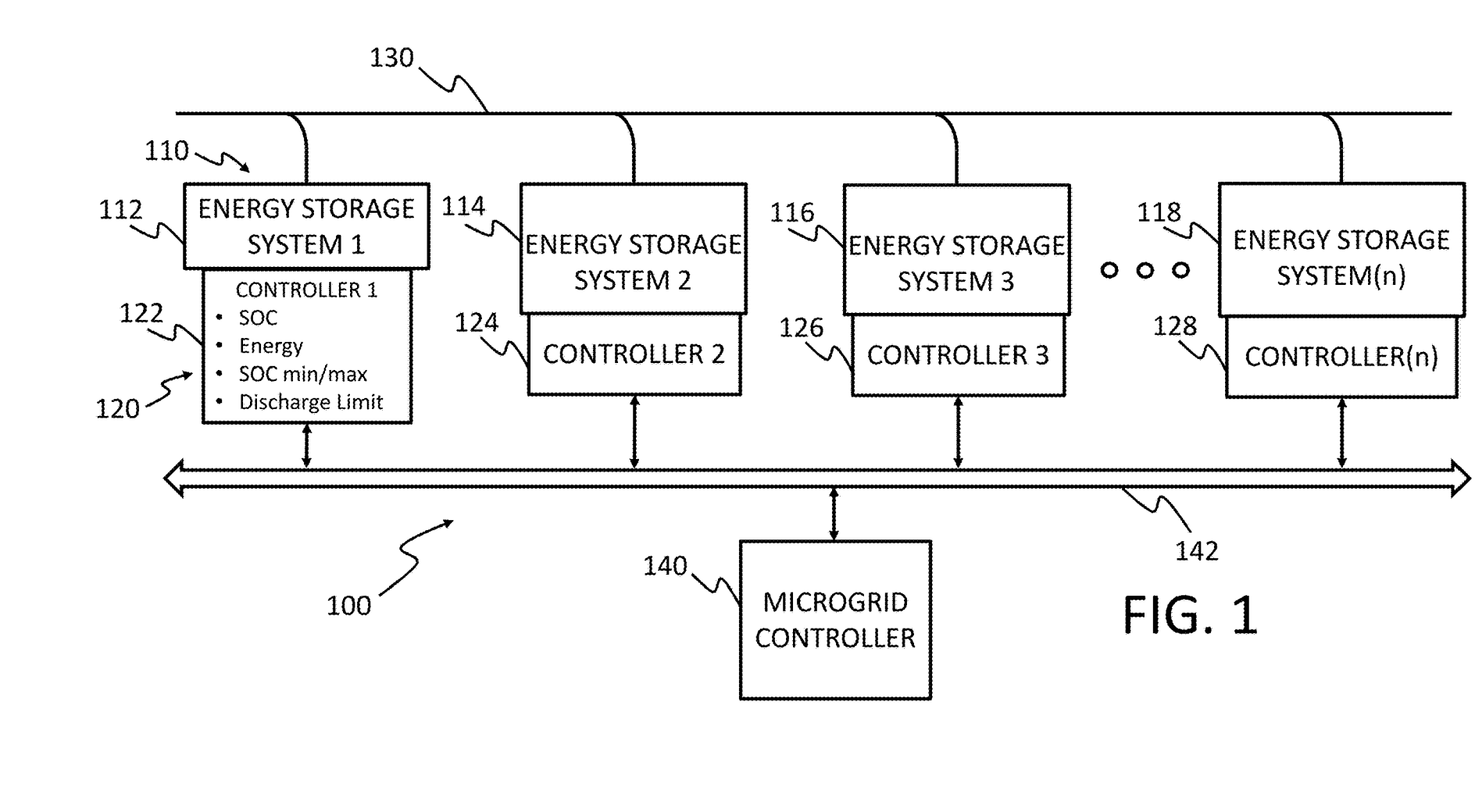
FIG. 1 illustrates an exemplary microgrid according to the present disclosure.

FIG. 1 illustrates a microgrid 100 including a plurality of energy storage systems ("ESS") 110. Each ESS 110 may include a local controller 120, and each ESS 110 may be coupled to a power bus 130 for receiving and discharging charge. Microgrid 100 may also include a microgrid controller 140 communicatively coupled the local controller 120 of each ESS 110 across a communication bus 142.

Any number of energy storage systems 110 could be included in microgrid 100. For example, as shown in FIG. 1, microgrid 100 may include a first energy storage system, ESS1 112, a second energy storage system, ESS2 114, a third energy storage system, ESS3 116, and an n-number energy storage system ESS(n) 118. Each ESS 110 may have a different configuration and be rated for a different power and energy capacity, as well as having a different state of charge ("SOC"). ESSs 112, 114, 116, 118 may include one or more batteries, fuel cells, supercapacitors, and/or any other type of energy storage source. In addition to a local controller 120, each ESS 110 may include any appropriate power electronics, such as switches, converters, and/or inverters to provide an appropriate interface between the ESS 110 and the power bus 130 and communication bus 142.

Referring still to FIG. 1, the local controllers 120 may include controller1 122 associated with the ESS1 112, Controller2 124 associated with ESS2 114, Controller3 126 associated with ESS3 116, and Controller(n) 128 associated with ESS(n) 118. Each local controller 120 may include any appropriate hardware, software, firmware, etc. to sense and control ESS 110, and send information to, and receive information from, microgrid controller 140. For example, local controller 120 may be configured to sense, determine, and/or store various characteristics of its respective energy storage system 110. Such characteristics of ESS 110 may include, among others, the current SOC, the current energy, the SOC minimum threshold, the SOC maximum threshold, and the discharge limit of ESS 110. These characteristics of ESS 110 may be sensed, determined, and/or stored in any conventional manner. While local controller 120 is described as a single controller, it is understood that controller 120 may include multiple controllers such that the functions associated with local controller 120 may be distributed among more than one controller.

Microgrid controller 140 may include any appropriate hardware, software, firmware, etc. to sense, determine, and/or store various aspect of microgrid 100, and control various aspects of microgrid 100. Microgrid controller 140 may also send information to, and receive information from, each of the plurality of energy storage systems 112, 114, 116, 118 via respective ESS local controllers 122, 124, 126, 128. For example, microgrid controller 140 may receive or determine the need for charging or discharging of power from the microgrid 100, and may be configured to determine and send signals to allocate a total charge request and/or total discharge request across each of the plurality of energy storage systems 110.

As will be discussed in more detail below, when performing the power allocation functions, microgrid controller 140 may allocate a total charge request and/or a total discharge request across the energy storage systems as a function of a usable energy capacity of each energy storage system 110. The usable energy capacity corresponds to the capacity or amount of energy an energy storage system can receive in response to a total charging request (usable charge energy), or the capacity or amount of energy an energy storage system can discharge in response to a total discharge request (usable discharge energy). The usable charge energy is a function of a maximum state of charge, current state of charge, and current energy of the energy storage system, and the usable discharge energy is a function of a minimum state of charge, current state of charge, and current energy of the energy storage system. Microgrid controller 140 may determine a usable charge/discharge capacity of each ESS 110, a desired charge/discharge of each ESS 110, and a remainder power. While microgrid controller 140 is described as a single controller, it is understood microgrid controller 140 may include multiple controllers such that the functions discussed herein of microgrid controller 140 may be distributed among more than one controller.

Microgrid controller 140 may send and receive information in any appropriate manner, using appropriate hardware, software, firmware, etc. and via wired and/or wireless systems. For example, as noted above, microgrid controller 140 may send and receive information to and from local controllers 120 of each ESS 110 via communication bus 142.

Figure 2:
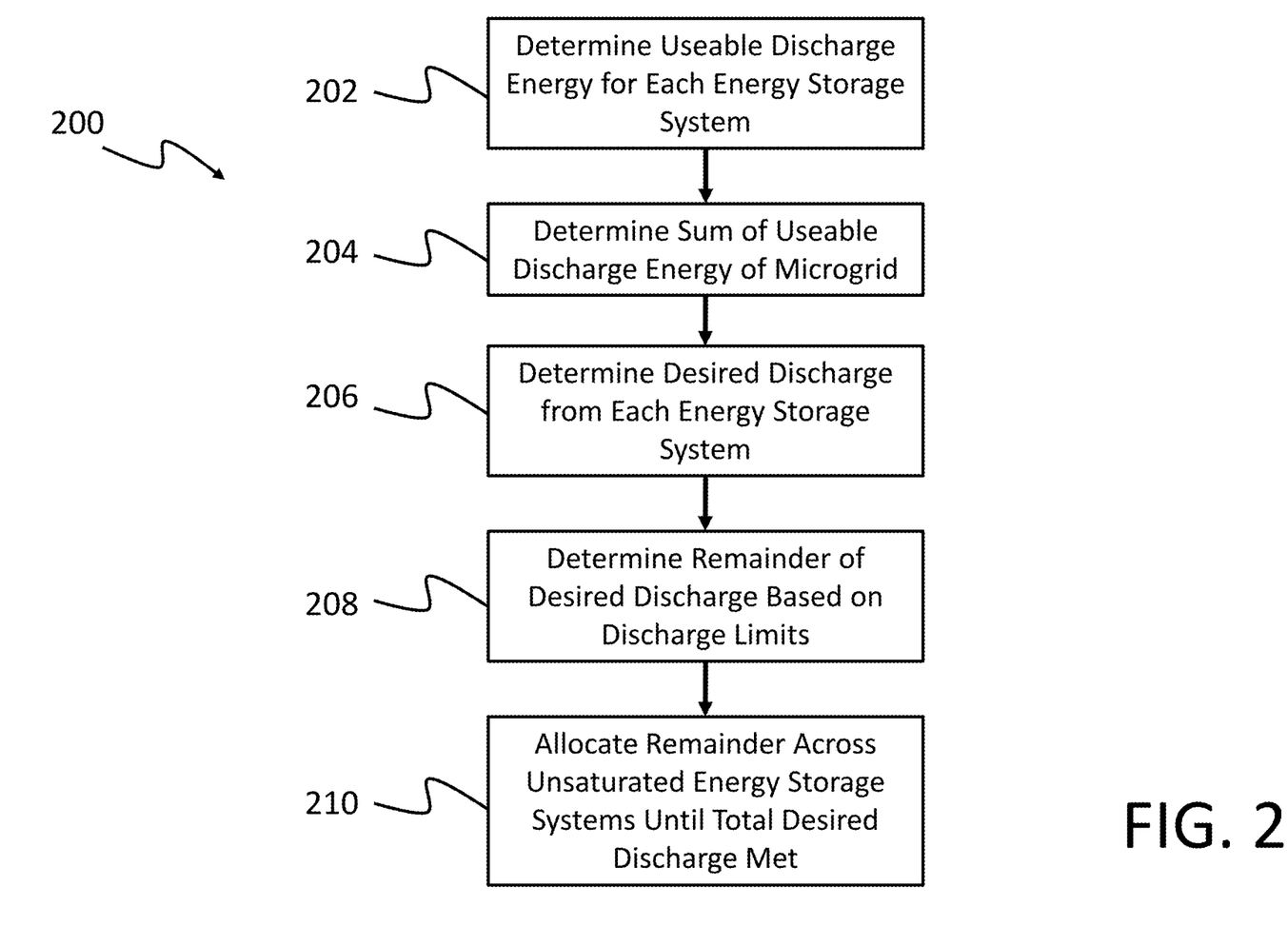
FIG. 2 provides a method for discharge power allocation across the microgrid of FIG. 1.

FIG. 2 provides a method 200 for discharge power allocation across microgrid 100. Thus, method 200 may correspond to a supervisory or other request or instruction received at microgrid controller 140 to discharge a total desired discharge of power from the energy storage systems 110 of microgrid 100 to power bus 130. Method 200 may include: determining a useable discharge energy for each energy storage system 110 (step 202), determining a sum of useable discharge energy of microgrid 100 (step 204), determining a desired discharge from each energy storage system 110 (step 206), determining a remainder of desired discharge based on discharge limits (step 208), and allocating the remainder across unsaturated energy storage systems 110 until the total desired discharge is met (step 210). The discharge power allocation method of FIG. 2 may be performed within microgrid controller 140 such that microgrid controller sends a discharge request to each ESS 110, or one or more aspects of method 200 may be performed by other controllers or systems, such as local controllers 120.

The determination of useable discharge energy for each energy storage system 110 (step 202) may include reading the current energy from each ESS 110, determining the energy content of ESS 110 at an SOC minimum threshold, and determining a usable discharge energy of the ESS 110 as the difference between the current energy and energy at the minimum SOC threshold. As provided in the Equation 1 below, the energy content of ESS 110 at SOC minimum threshold may be determined as an extrapolation from the current SOC of ESS 110 and the SOC minimum threshold. In this equation, and the equations that follow, ESS(i) refers to ESS1 through ESS(n).

$$\text{Usable Discharge Energy of ESS}(i) = \text{Current Energy of ESS}(i) - (\text{Current Energy of ESS}(i) * (\text{SOC min of ESS}(i)/\text{current SOC of ESS}(i))) \quad \text{[Equation 1]}$$

In Step 204 of method 200, the determined usable discharge energy of each ESS (112, 114, 116, 118) determined in accordance with Equation 1 is summed to provide a total usable energy of the microgrid 100.

$$\text{Usable Discharge Energy Total} = \text{Sum}(\text{Usable Discharge Energy of ESS}(i)) \quad \text{[Equation 2]}$$

In Step 206 a desired discharge is determined for each energy storage system 110. This can be determined by multiplying the total desired discharge of the microgrid 100 by the ratio of the Usable Discharge Energy (Equation 1) of an individual energy storage system 110 to the Usable Discharge Energy Total (Equation 2).

$$\text{Desired Discharge ESS}(i) = \text{Total Desired Discharge} * (\text{Usable Discharge Energy ESS}(i)/\text{Usable Discharge Energy Total}) \quad \text{[Equation 3]}$$

When the method 200 moves to step 208—determining a remainder of desired discharge based on discharge limits—the microgrid controller 140 makes sure that the desired discharge of an ESS 110 does not exceed the discharge limit of the ESS 110. If the desired discharge for an ESS 110 would exceed the discharge limit for the ESS 110, microgrid controller establishes a remainder corresponding to the difference between the desired discharge and discharge limit for the ESS 110. See Equation 4 below. As provided in Equation 5 below, the remainders for each of the ESS 110 are then summed to find a reminder total.

If Desired Discharge of ESS($i$)>Discharge Limit of ESS($i$) then:

Desired Discharge ESS($i$)=Discharge Limit of ESS($i$) and Remainder of ESS($i$)=(Desired Discharge ESS($i$)−Discharge Limit($i$))

If Desired Discharge of ESS($i$)≤Discharge Limit of ESS($i$) then:

Desired Discharge ESS($i$)=Desired Discharge ESS($i$) and

Remainder of ESS($i$)=0     [Equation 4]

Total Remainder=Sum(Remainder of ESS($i$))     [Equation 5]

Step 210 of FIG. 2 includes the microgrid controller 140 distributing or allocating the total remainder to any ESS 110 that is not saturated—any ESS 110 that has not reached its discharge limit. The total remainder may then be allocated by determining a remaining desired discharge using a ratio of the remaining unsaturated ESS's 110 individual usable discharge energy to the usable discharged energy of all of the unsaturated ESSs. And this process is repeated until the remainder is zero. Thus, steps 206-210 determine the commands sent to each ESS 110 from the microgrid controller 140, and these commands are sent during these steps until the total desired discharge is met. The discharge request for each ESS includes the desired discharge plus any remaining desired discharge. This step 210 of method 200 may be further explained with the following equations.

For any ESS($i$) where the Desired Discharge<Discharge Limit:

Remaining Desired Discharge=Total Remainder* (Usable Discharge Energy($i$)/Usable Discharged Energy Total)     [Equation 6]

Desired Discharge($i$)=Desired Discharge($i$)+Remaining Desired Discharge($i$)     [Equation 7]

Figure 3:
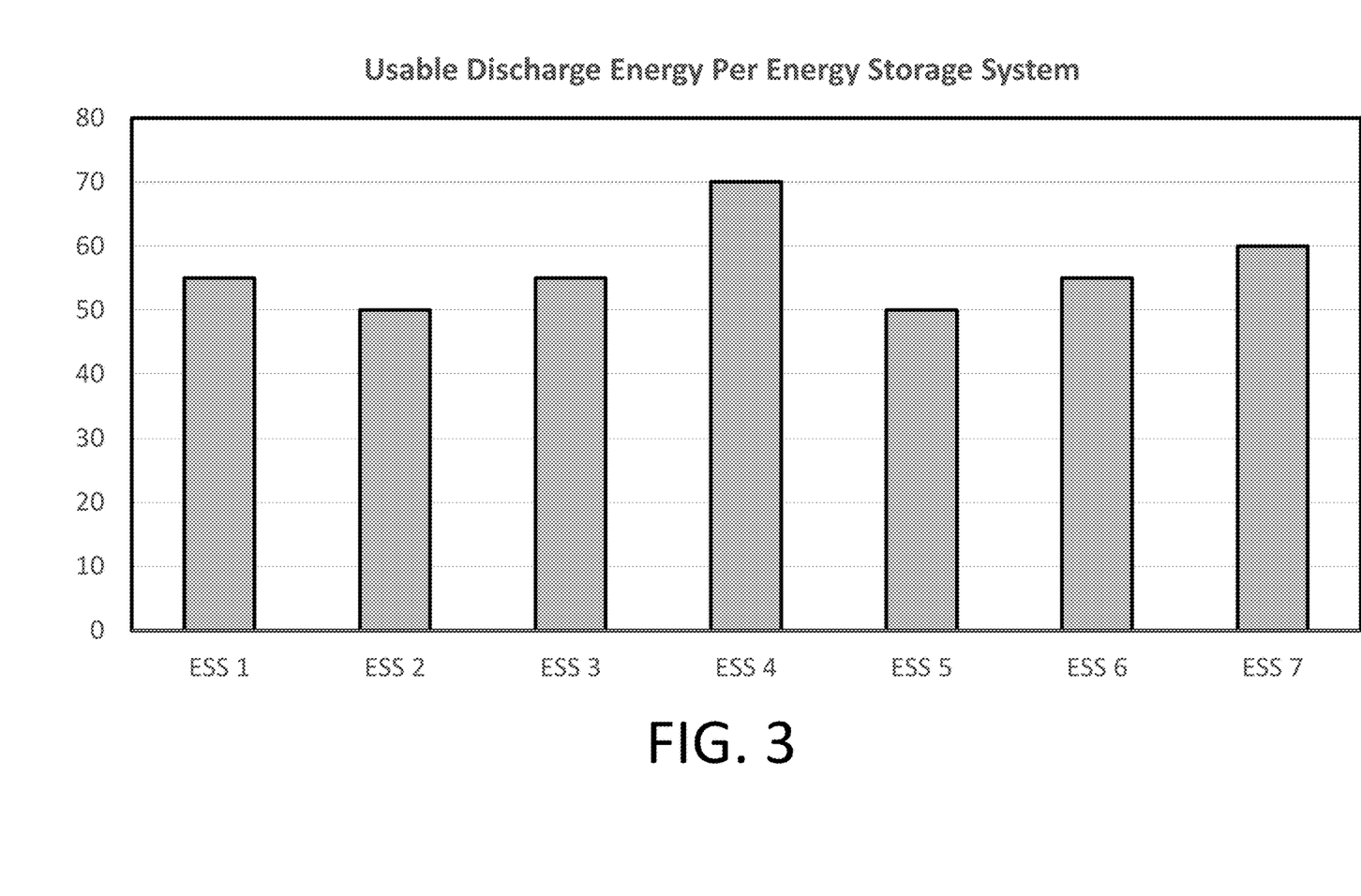
FIG. 3 illustrates an exemplary bar chart of usable discharge energy of energy storage systems of the microgrid of FIG. 1.
Figure 4:
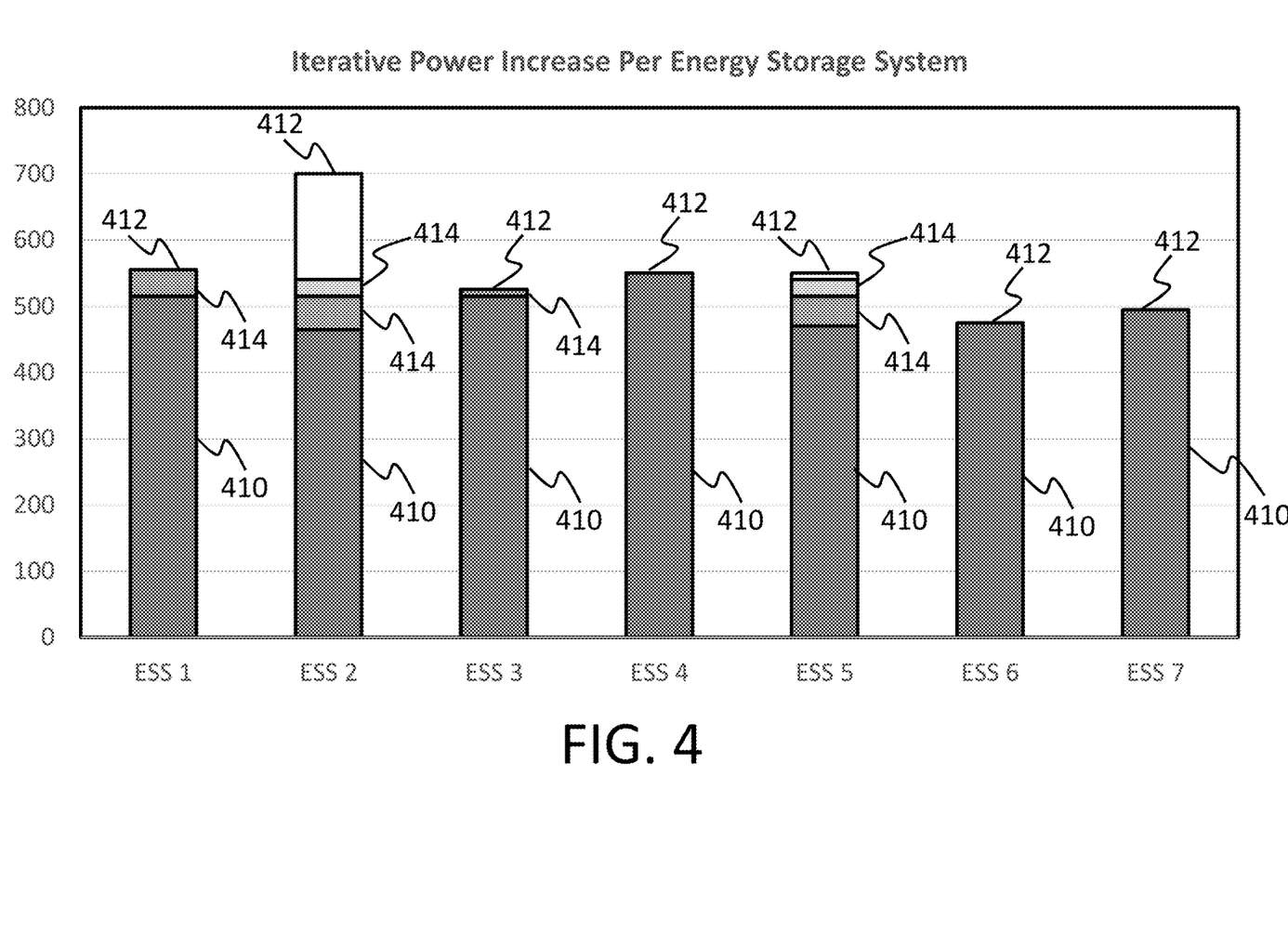
FIG. 4 illustrates an exemplary bar chart of iterative power increase per energy storage system of the microgrid of FIG. 1.
Figure 5:
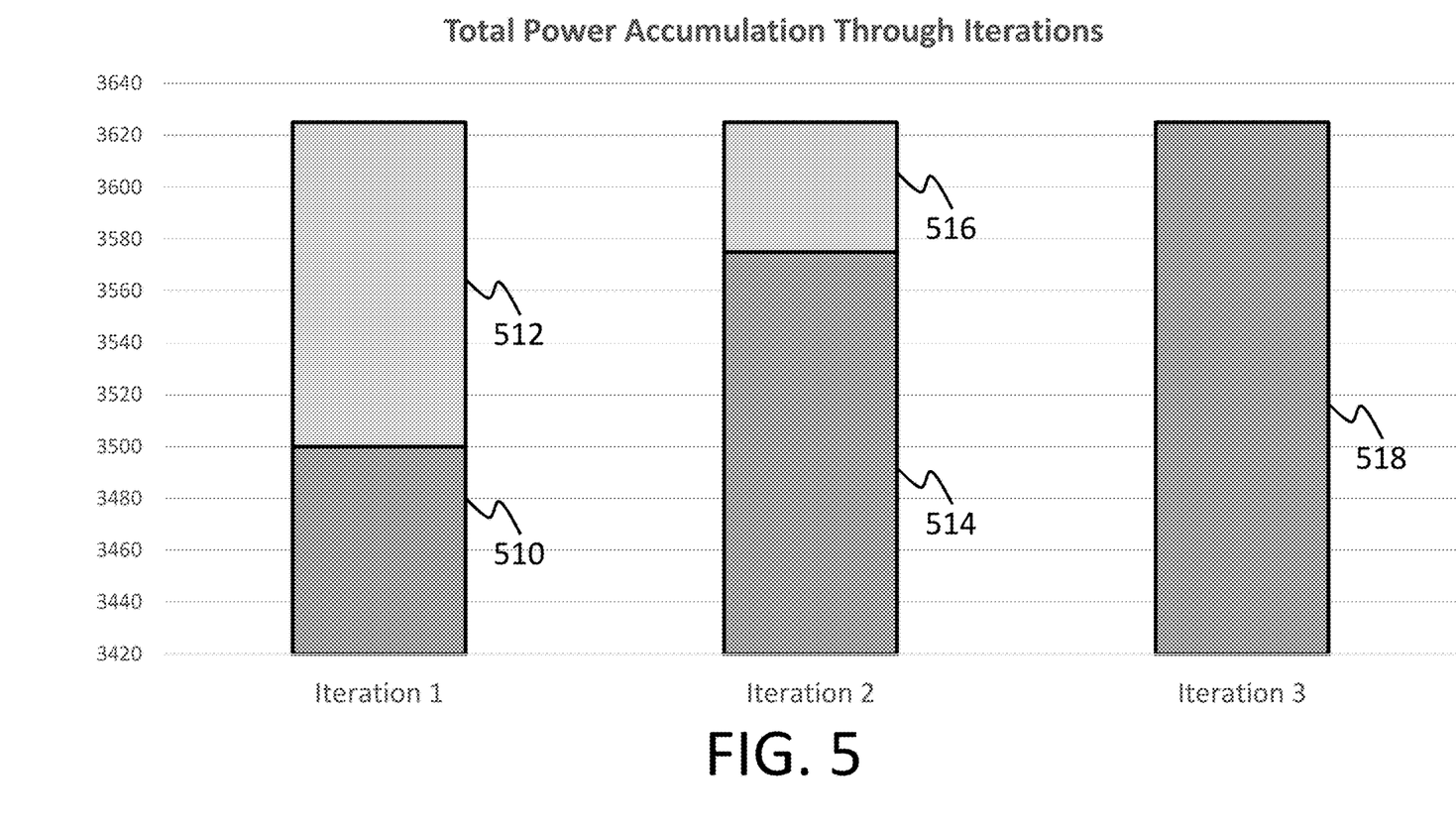
FIG. 5 illustrates an exemplary bar chart of total power accumulation through iterations for the microgrid of FIG. 1.

The discharge power allocation method 200 of FIG. 2 may be further explained with reference to the bar charts of FIGS. 3-5. In the charts of FIGS. 3-5, seven energy storage systems 110 are used, with different discharge limits and usable discharge energy. FIG. 3 provides a chart where the bars represent the usable discharge energy for each ESS 110 in accordance with Equation 1 above. As shown in the chart, ESS 4 has the most usable discharge energy, and ESS2 and ESS5 have the least usable discharge energy.

While FIG. 3 shows usable discharge energy (e.g., kWh), FIG. 4 shows power allocation across each ESS 110 (e.g., kW). The power allocation is determined in accordance with Equations 3-7 above. In particular, each bar in FIG. 4 includes a first iteration desired discharge 410 corresponding to the desired discharge of the ESS in a first iteration of allocating the total desired discharge. As provided by Equation 3 above, the first iteration desired discharge 410 of ESS4 is larger than that of ESS2 and ESS5, indicating that ESS4 receives a greater power allocation in the first iteration than ESS2 and ESS5 because ESS 4 has a larger usable discharge energy.

First iteration desired discharge 410 of ESS4, ESS6, and ESS7 extend the entire height of the bar, indicating that the desired discharge of the first iteration is greater than or equal to the discharge limit 412 of ESS4, ESS6, and ESS7 in accordance with Equation 4 above. Thus, these energy storage systems 110 may provide a remainder and the sum of these remainders corresponds to the total remainder of Equation 6 above. The first iteration desired discharge 410 of ESS1, ESS2, ESS3, and ESS5 is less than their respective discharge limits 412, and thus the total remainder may be allocated in accordance with Equation 6 to these energy storage systems 110. These energy storage systems will have second iteration remaining desired discharges 414, with those of ESS1 and ESS3 meeting or exceeding their respective discharge limits. ESS1 and ESS3 may thus provide another remainder to be allocated in accordance with Equation 6 to ESS2 and ESS5. These energy storage systems will have third iteration remaining desired discharges 416. Since these allocations do not meet the discharge limits for ESS2 or ESS5, then there is no remainder and the third iteration has allocated the total desired discharge. At this point, the discharge request sent from microgrid controller 140 to the local controllers 120 of each ESS 110 can be determined in accordance with Equation 7.

The bar chart of FIG. 5 shows the total power accumulation across the three iterations. As shown, the first iteration provides for a desired discharge 510 and a total remainder 512, and the second iteration provides for a greater desired discharge 514 and smaller remainder 516. Iteration 3 includes a desired discharge 518 equal to the total desired discharge, and thus has no remainder.

Figure 6:
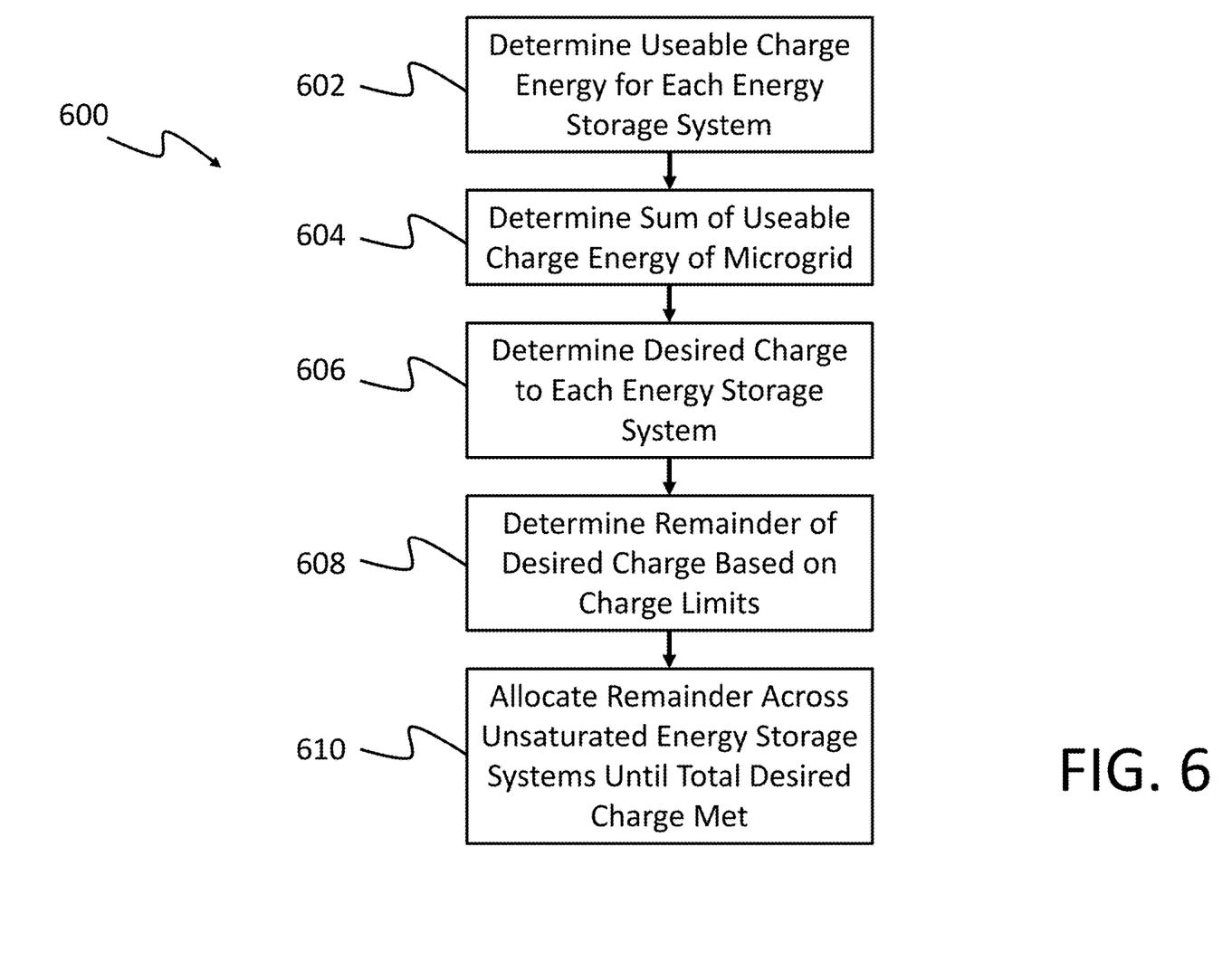
FIG. 6 provides a method for charge power allocation across the microgrid of FIG. 1.

The previous discussion of FIGS. 2-5 addressed discharge power allocation. When microgrid controller 140 receives a total charge request, the request may be allocated to each ESS 110 in a manner similar to that described above for discharge power allocation. FIG. 6 provides a method 600 for charge power allocation across microgrid 100. Method 600 may correspond to a supervisory request received at microgrid controller 140 to charge a total desired charge of power to the energy storage systems 110 of microgrid 100 from power bus 130. Method 600 may include: determining a useable charge energy for each energy storage system 110 (step 602), determining a sum of useable charge energy of microgrid 100 (step 604), determining a desired charge to each energy storage system 110 (step 606), determining a remainder of desired charge based on charge limits (step 608), and allocating the remainder across unsaturated energy storage systems 110 until the total desired charge is met (step 610). The charge power allocation method of FIG. 6 may be performed within microgrid controller 140 such that microgrid controller sends a charge request to each ESS 110, or one or more aspects of method 600 may be performed by other controllers or systems, such as local controllers 120.

The determination of useable charge energy for each energy storage system 110 (step 602) during charge power allocation may include reading the current energy from each ESS 110, determining the energy content of ESS 110 at an SOC maximum threshold, and determining a usable energy of the ESS 110 as the difference between the current energy and energy at the maximum threshold. As provide in the equation below, the energy content of ESS 110 at SOC maximum threshold may be determined as an extrapolation from the current SOC of ESS 110 and the SOC maximum threshold. In this equation, and the equations that follow, ESS(i) refers to ESS1 through ESS(n).

Usable Charge Energy of ESS($i$)=Current Energy of ESS($i$)−(Current Energy of ESS($i$)*(SOC max of ESS($i$)/SOC of ESS($i$)))     [Equation 8]

In Step 604 of method 600, the usable charge energy of each ESS 112, 114, 116, 118 is summed to provide a total usable charge energy of the microgrid 100.

Usable Charge Energy Total=Sum(Usable Charge Energy of ESS(i)) [Equation 9]

In Step 606 a desired charge is determined for each energy storage system 110. This can include multiplying the total desired charge of the microgrid 100 by the ratio of the usable charge of an individual energy storage system 110 to the total usable charge energy.

Desired Charge ESS(i)=Total Desired Charge*(Usable Charge Energy ESS(i)/Usable Charge Energy Total) [Equation 10]

When the method 600 moves to step 608—determining a remainder of desired charge based on charge limits—the microgrid controller 140 makes sure that the desired charge of an ESS 110 does not exceed the charge limit of the ESS 110. If the desired charge for an ESS 110 exceeds the charge limit for the ESS 110, microgrid controller establishes a remainder corresponding to the difference between the desired charge and charge limit for the ESS 110. The remainders for each of the ESS 110 are then summed to find a reminder total.

If Desired Charge of ESS(i)>Charge Limit of ESS(i) then:

Desired Charge ESS(i)=Charge Limit of ESS(i) and

Remainder of ESS(i)=(Desired Charge ESS(i)−Charge Limit(i))

If Desired Charge of ESS(i)≤Charge Limit of ESS(i) then:

Desired Charge ESS(i)=Desired Charge ESS(i) and

Remainder of ESS(i)=0 [Equation 11]

Total Remainder=Sum(ESS(i)) [Equation 12]

Step 610 of FIG. 6 includes the microgrid controller 140 distributing or allocating the total remainder to any ESS 110 that is not saturated—any ESS 110 that has not reached its charge limit. The total remainder may then be allocated by determining a remaining desired charge using a ratio of the remaining unsaturated ESS's 110 individual usable charge energy to the usable charged energy of all of the unsaturated ESSs 110. And this process is repeated until the remainder is zero. Thus, steps 606-610 determine the commands sent to each ESS 110 from the microgrid controller 140, and these commands are sent during these steps until the total desired charge is met. The charge request for each ESS includes the desired charge plus any remaining desired charge. This step 210 of method 200 may be further explained with the following equations.

For any ESS(i) where the Desired Charge<Charge Limit:

Remaining Desired Charge=Total Remainder*(Usable Charge Energy(i)/Usable Charged Energy Total) [Equation 13]

Desired Charge(i)=Desired Charge(i)+Remaining Desired Charge(i) [Equation 14]

INDUSTRIAL APPLICABILITY

The disclosed methods and systems for charging and/or discharging energy storage systems may be used in any microgrid-type system that sends and receives power.

The methods and systems disclosed herein may provide a balancing of state of charge (SOC) and power distribution across energy storage systems 110 of a microgrid 100 when the energy storage systems 110 of the microgrid 100 have different power and/or energy capacities and different states of charge. The method and systems allow for microgrid controller 140 to provide asymmetric charge or discharge requests as a function of usable capacity of each energy storage system 110. With this, the systems and methods disclosed herein may allow the SOC of each energy storage system 110 to eventually converge when the rated capacities of energy storage systems are different. Providing such a balancing of the SOC of the energy storage systems 110 may extend the health and life of the systems, and thus may extend the health and life of the microgrid 100.

It will be apparent to those skilled in the art that various modifications and variations can be made to the disclosed machine without departing from the scope of the disclosure. Other embodiments of the machine will be apparent to those skilled in the art from consideration of the specification and practice of the system and methods described herein. For example, the above described process steps need not be performed in the order described, but rather certain steps can be performed in a different order and/or can be performed simultaneously with other steps. Further, it is understood that one or more of the energy storage systems 110 of microgrid 100 may be excluded from the charge or discharge allocations provided above. It is intended that the specification and examples be considered as exemplary only, with a true scope of the disclosure being indicated by the following claims and their equivalents.

What is claimed is:

1. A method of allocating power across a microgrid having a plurality of energy storage systems with different power and/or energy capacities, and different states of charge, the method comprising:
   determining a usable charge energy for each energy storage system, wherein the usable charge energy is determined based on a difference between current energy and energy content at a state of charge maximum threshold of each energy storage system;
   determining a usable discharge energy for each energy storage system, wherein the usable discharge energy is determined based on a difference between the current energy and the energy content at a state of charge minimum threshold of each energy storage system;
   determining a total usable charge energy and/or a total usable discharge energy of the microgrid based on the usable charge energy and the usable discharge energy of the energy storage systems; and
   allocating a total charge request and/or a total discharge request across the energy storage systems as a function of a usable energy capacity of each energy storage system.

2. The method of allocating power of claim 1, wherein the usable energy capacity is a capacity of the energy storage system to receive energy in response to the total charge request or a capacity of the energy storage system to discharge energy in response to the total discharge request.

3. The method of allocating power of claim 1, wherein the allocation is based on a ratio of the usable energy capacity of each energy storage system to a total usable energy capacity of all of the energy storage systems combined.

4. The method of allocating power of claim 1, wherein the allocation is also a function of a charge limit when allocating the total charge request, and the allocation is also a function of a discharge limit when allocating the total discharge request.

5. The method of allocating power of claim 1, wherein the energy storage systems include at least one of a battery system or a fuel cell system.

6. The method of allocating power of claim 1, further including:
determining the usable energy capacity of each energy storage system based on a current energy and current state of charge of the energy storage system.

7. The method of allocating power of claim 6, further including:
determining a desired charge for each energy storage system when allocating the total charge request; and
determining a desired discharge for each energy storage system when allocating the total discharge request.

8. The method of allocating power of claim 7, further including:
determining a remainder of the desired charge for each energy storage system when allocating the total charge request; and
determining a remainder of the desired discharge for each energy storage system when allocating the total discharge request; and
the remainder of the desired charge is a function of a charge limit of the energy storage system, and the remainder of the desired discharge is a function of a discharge limit of the energy storage system.

9. The method of allocating power of claim 8, further
allocating the remainder of the desired charge across unsaturated energy storage systems until the total charge request is met; and
allocating the remainder of the desired discharge across the unsaturated energy storage systems until the total discharge request is met.

10. The method of allocating power of claim 9, further including:
sending a desired charge request to each energy storage system as a sum of the desired charge and any remainder of the desired charge; and
sending a desired discharge request to each energy storage system as a sum of the desired discharge charge and any remainder of the desired discharge.

11. The method of allocating power of claim 10, wherein the microgrid allocates both the total charge request and the total discharge request.

12. The method of allocating power of claim 1, wherein distributing power from the energy storage system is asymmetric across the energy storage systems to balance the state of charge and power distribution between the energy storage systems.

13. A method of allocating power across a microgrid having a plurality of energy storage systems with different power and/or energy capacities, and different states of charge; the method comprising:
determining a usable charge energy for each energy storage system, wherein the usable charge energy is determined based on a difference between current energy and energy content at a state of charge maximum threshold of each energy storage system;
determining a usable discharge energy for each energy storage system, wherein the usable discharge energy is determined based on a difference between the current energy and the energy content at a state of charge minimum threshold of each energy storage system;
determining a total usable charge energy and/or a total usable discharge energy of the microgrid based on the usable charge energy and the usable discharge energy of the energy storage systems; and
allocating a total charge request and/or a total discharge request across the energy storage systems as a function of a current energy, and current state of charge of each energy storage system.

14. The method of allocating power of claim 13, wherein the allocation of the total charge request is also a function of a maximum state of charge of the energy storage system; and the allocation of the total discharge request is also a function of a minimum state of charge of the energy storage system.

15. The method of allocating power of claim 14, wherein the allocation is based on a ratio of a usable energy capacity of each energy storage system to a total usable energy capacity of all of the energy storage systems combined, and wherein the allocation is asymmetric across the energy storage systems.

16. The method of allocating power of claim 15, wherein the allocation is also a function of a charge limit when allocating the total charge request, and the allocation is also a function of a discharge limit when allocating the total discharge request.

17. The method of allocating power of claim 16, wherein the energy storage systems include at least one of a battery system or a fuel cell system.

18. The method of allocating power of claim 15, wherein distributing power from the energy storage system is asymmetric across the energy storage systems to balance the state of charge and power distribution between the energy storage systems.

19. A microgrid system, comprising:
a plurality of energy storage systems having different power and/or energy capacities, and different states of charge;
each of the plurality of energy storage systems includes a local controller that is communicatively coupled to a power bus for receiving and discharging a charge; and
a microgrid controller communicatively coupled to the local controller of each of the plurality of energy storage system across a communication bus for sending information to, and receiving information from, each of the plurality of energy storage systems, wherein each of the plurality of energy storage systems includes power electronics to provide an interface between the energy storage system and the power bus and the energy storage system and the communication bus, the microgrid controller configured to:
allocate a total charge request and/or a total discharge request across the energy storage systems as a function of a usable energy capacity of each energy storage system.

20. The microgrid system of claim 19, wherein the microgrid controller is further configured to allocate both the total charge request and the total discharge request, and:
determine the usable energy capacity of each energy storage system based on a current energy and current state of charge of the energy storage system;
determine a desired charge for each energy storage system when allocating the total charge request, and determine a desired discharge for each energy storage system when allocating the total discharge request;
determine a remainder of the desired charge for each energy storage system when allocating the total charge request, and determine a remainder of the desired discharge for each energy storage system when allocating the total discharge request; wherein the remainder of the desired charge is a function of a charge limit of the energy storage system, and the remainder of the desired discharge is a function of a discharge limit of the energy storage system;

allocate the remainder of the desired charge across unsaturated energy storage systems until the total charge request is met, and allocate the remainder of the desired discharge across the unsaturated energy storage systems until the total discharge request is met; and send a desired charge request to each energy storage system as a sum of the desired charge and any remainder of the desired charge, and send a desired discharge request to each energy storage system as a sum of the desired discharge charge and any remainder of the desired discharge.

21. The method of allocating the power of claim 7, further comprising:

determining the desired discharge by multiplying total desired discharge of the microgrid by a ratio of the usable discharge energy to the total usable discharge energy.

22. The method of allocating the power of claim 21, further comprising:

determining the desired discharge exceed a discharge limit of at least one energy storage system; and determining a remainder corresponding to a difference between the desired discharge and the discharge limit for the energy storage systems, wherein the remainder is allocated to at least one other energy storage system that has not reached its discharge limit.

\* \* \* \* \*